US006539152B1

(12) United States Patent
Fewkes et al.

(10) Patent No.: US 6,539,152 B1
(45) Date of Patent: *Mar. 25, 2003

(54) COMPOSITION CONTAINING TACKIFIER AND METHOD OF MODIFYING TIME-SENSITIVE RHEOLOGICAL PROPERTIES OF OPTICAL FIBER COATING

(75) Inventors: Edward J. Fewkes, Horseheads, NY (US); Gregory F. Jacobs, Elmira, NY (US); Kenneth R. Jones, Arkport, NY (US); Huan-Hung Sheng, Horseheads, NY (US); Frederic C. Wagner, Horseheads, NY (US); Michael J. Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 09/747,044

(22) Filed: Dec. 21, 2000

Related U.S. Application Data

(60) Provisional application No. 60/173,673, filed on Dec. 30, 1999.

(51) Int. Cl.$^7$ .................. G02B 6/00; C09D 133/04; C09D 175/14; C09D 193/04
(52) U.S. Cl. .............. 385/114; 385/115; 385/123; 385/128; 385/145; 427/513; 427/163.2; 428/378; 522/96; 522/109; 522/110; 522/111; 522/112
(58) Field of Search .............. 428/378; 522/90, 522/91, 92, 93, 94, 95, 96, 97, 109, 110, 111, 112; 385/114, 115, 123, 128, 145; 427/513, 163.2

(56) References Cited

U.S. PATENT DOCUMENTS

| 4,474,830 A | 10/1984 | Taylor ................ 427/54.1 |
| 4,608,409 A | 8/1986 | Coady et al. ............. 524/199 |
| 4,609,718 A | 9/1986 | Bishop et al. ............ 528/49 |
| 4,752,112 A | 6/1988 | Mayr .................. 350/96.23 |
| 4,851,165 A | 7/1989 | Rennell et al. ........... 264/1.5 |
| 4,962,992 A | 10/1990 | Chapin et al. .......... 350/96.23 |
| 5,046,815 A | 9/1991 | Cain et al. ............ 350/96.23 |
| 5,104,433 A | 4/1992 | Chapin et al. ............ 65/3.1 |
| 5,146,531 A | 9/1992 | Shustack ............... 385/128 |
| 5,486,378 A | 1/1996 | Oestreich et al. ........ 427/163.2 |
| 5,536,772 A | 7/1996 | Dillman et al. ........... 524/483 |
| 5,643,655 A | 7/1997 | Passarino ............... 428/143 |
| 5,998,497 A | 12/1999 | Ishikawa et al. ........... 522/96 |
| 6,240,230 B1 * | 5/2001 | Szum .................. 385/100 |
| 6,316,516 B1 * | 11/2001 | Chien et al. |
| 6,326,416 B1 * | 12/2001 | Chien et al. ............. 427/515 |

FOREIGN PATENT DOCUMENTS

EP      0 505 581 A1    3/1992    ......... C03C/25/02

OTHER PUBLICATIONS

"Tackifier Resins" by Schlademan, in *Handbook of Pressure Sensitive Adhesive Technology*, pp. 609–631 (Warwick, RI)(1999).
Midwinter, *Optical Fibers for Transmission*, New York, John Wiley, pp. 166–178 (1979).
"The Outside Vapor Deposition Method of Fabricating Optical Waveguide Fibers" by Blankenship et al, *IEEE J. Quantum Electron*, 18:1418–1423 (1982).

* cited by examiner

*Primary Examiner*—Susan W. Berman
(74) *Attorney, Agent, or Firm*—James V. Suggs; Timothy R. Krogh

(57) ABSTRACT

The present invention relates to a composition for preparing optical fiber coatings, the composition including a polymerizable base composition, containing at least one monomer and optionally at least one oligomer, wherein the polymerizable base composition is substantially free of unsaturated epoxidized diene polymers, and a tackifier present in an amount effective to modify a time-sensitive rheological property of a polymerization product of the composition. Another aspect of the present invention relates to a method of modifying a time-sensitive rheological property of an optical fiber coating by introducing into a polymerizable composition a tackifier in an amount effective to modify a time-sensitive rheological property of the polymerization product of the polymerizable composition. Also disclosed are an optical fiber, a fiber optic ribbon, and a fiber bundle that contain coating(s) prepared from a composition of the present invention.

39 Claims, 2 Drawing Sheets

US 6,539,152 B1

COMPOSITION CONTAINING TACKIFIER AND METHOD OF MODIFYING TIME-SENSITIVE RHEOLOGICAL PROPERTIES OF OPTICAL FIBER COATING

CROSS-REFERENCE TO RELATED APPLICATIONS

This application is a Continuation U.S. Provisional Patent Application Ser. No. 60/173,673 filed on Dec. 30, 1999, the content of which is relied upon and incorporated herein by reference in its entirety, and the benefit of priority under 35 U.S.C. §119(e) is hereby claimed.

FIELD OF THE INVENTION

The present invention relates to compositions for preparing optical fiber coatings, optical fibers prepared with such coatings, and a method of modifying time-sensitive rheological properties of optical fiber coatings.

BACKGROUND OF THE INVENTION

Optical fibers, including fiber optic ribbons, have acquired an increasingly important role in the field of communications, frequently replacing existing copper wires. This trend has had a significant impact in the local area networks (i.e., for fiber-to-home uses), which have seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business for internal data, voice, and video communications has begun and is expected to increase.

Optical fibers typically contain a glass fiber (i.e., core and cladding) and at least two coatings, i.e., a primary coating and a secondary coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use.

Fiber optic ribbons contain a plurality of planar aligned optical fibers (i.e., coated optical fibers) that are circumscribed by a single or multi-layered coat of a matrix composition. Like the secondary coating of an individual optical fiber, the matrix functions as a tough, protective outer layer that prevents damage to the individual optical fibers during processing and use.

Certain characteristics are desirable for the primary coatings. The modulus of the primary coating must be sufficiently low to cushion and protect the fiber by readily relieving stresses on the fiber, which can induce microbending and, consequently, inefficient signal transmission. This cushioning effect must be maintained throughout the lifetime of the fiber. Because of differential thermal expansion properties between the primary and secondary coatings, the primary coating must also have a glass transition temperature ($T_g$) that is lower than the foreseeable lowest use temperature. The primary coating must also maintain adequate adhesion to the glass fiber during thermal and hydrolytic aging, yet be strippable therefrom for purposes of splicing or coupling. Poor adhesion can result in microbending and/or various sized delaminations, which can be significant sources of attenuation in the optical fiber.

Certain characteristics are desirable for the secondary coating on optical fibers and matrix coatings in fiber optic ribbons. Before curing, the coating composition should have a suitable viscosity and be capable of curing quickly to enable processing of the optical fiber or ribbon. After curing, secondary and matrix coatings should have the following characteristics: sufficient stiffness to protect the encapsulated glass fiber yet enough flexibility for handling (i.e., modulus), low water absorption, low tackiness to enable handling of the optical fiber or ribbon, chemical resistance, and sufficient adhesion to the underlying coating.

The ability of these different coatings to behave in a desired manner requires that each coating possess certain rheological properties. Typically, rheological properties of a particular material are considered with respect to their temperature sensitivity (i.e., temperature versus modulus curve), with the material possessing glassy attributes below the glass transition temperature and possessing rubbery attributes above the glass transition temperature. However, the rheological properties are also dependent upon the time (or rate) over which a stress is applied to the material.

Coatings are often exposed to different stresses during the lifetime of an optical fiber or fiber optic ribbon. It is desirable, therefore, for such coatings to perform in a predictable manner under each of these different stresses. For example, the coatings experience a low rate of stress as they are spooled and unspooled or handled in coupling the optical fiber to another optical fiber or light source. If the coating cannot accommodate a slow-rate stress, then the stress applied to the optical fiber or fiber optic ribbon can be transmitted to the underlying glass fiber(s). As a result, microbending of the glass fiber(s) may occur. In contrast to this slow-rate stress, the coatings experience a high rate of stress as they are stripped from the underlying waveguide core and during processing of the optical fibers. During stripping operations, a conventional stripping device (i.e., manufactured by Fujikura or Sumitomo) cleaves the coatings about a circumference of the optical fiber prior to stripping the coatings off the end of the glass fiber(s). During processing, primary coatings are often exposed to high-rate stress as coated fibers are drawn through a coating die during application of secondary or matrix coatings. Tearing of the primary coating can result in coating defects along the length of the optical fiber or ribbon.

Because of the different stresses placed upon the various coatings employed in optical fibers and ribbons, it would be desirable to provide compositions that can be used to prepare coatings having desirable rheological properties under both low-rate and high-rate stresses. The present invention overcomes this deficiency in the prior art.

SUMMARY OF THE INVENTION

One aspect of the present invention relates to a composition for preparing optical fiber coatings. The composition contains a polymerizable base composition, including at least one monomer and optionally at least one oligomer, wherein the polymerizable base composition is substantially free of unsaturated epoxidized diene polymers, and a tackifier present in an amount effective to modify a time-sensitive rheological property of a polymerization product of the composition. Also disclosed are optical fibers, fiber optic ribbons, and fiber bundles that contain a coating which is the polymerization product of a composition of the present invention.

Another aspect of the present invention relates to a method of modifying a time-sensitive rheological property of an optical fiber coating. The method includes introducing into a polymerizable composition a tackifier in an amount effective to modify a time-sensitive rheological property of the polymerization product of the polymerizable composition.

A further aspect of the present invention relates to a method of improving the strippability of one or more coating materials from an optical fiber. This method includes preparing an optical fiber comprising a fiber encapsulated by a coating, the coating being a polymerization product of a polymerizable composition comprising an amount of a tackifier effective to improve the strippability of the coating from the fiber core.

Another aspect of the present invention relates to a method of improving the processing characteristics of a coating material during preparation of an optical fiber. This method includes preparing an optical fiber comprising a fiber encapsulated by a coating, the coating being a polymerization product of a polymerizable composition comprising an amount of a tackifier effective to reduce the occurrence of coating failure during said preparing an optical fiber.

Still another aspect of the present invention relates to a method of reducing the occurrence of microbending during handling or use of an optical fiber. This method includes preparing an optical fiber comprising a fiber encapsulated by a coating, the coating being a polymerization product of a polymerizable composition comprising an amount of a tackifier effective to reduce the occurrence of microbending.

Applicants have discovered that introduction of a tackifier into a polymerizable composition can modify time-sensitive rheological properties of cured optical fiber coatings (i.e., a polymerization product) prepared from the composition. By modifying the time-sensitive rheological properties of the cured coatings, it is possible to prepare optical fiber coatings which will behave in a desired manner under certain stress situations, in particular high or low stress rates. Thus, optical fiber coatings will behave more like a glassy product when exposed to high stress rates and more like a rubbery product when exposed to low stress rates. This enables the coatings of the present invention to reduce the occurrence of microbending, to enhance the strip cleanliness of fibers during stripping operations, and to minimize the occurrence of processing defects during fiber or ribbon preparation.

DETAILED DESCRIPTION OF THE INVENTION

Figure 1:
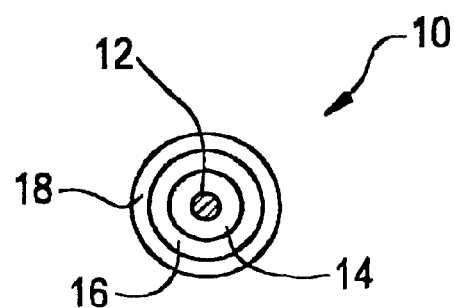
FIG. 1 is a cross-sectional view of an optical fiber of the present invention.

One aspect of the present invention relates to a composition for preparing optical fiber coatings that contains a polymerizable base composition, including at least one monomer and optionally at least one oligomer, and a tackifier present in an amount effective to modify a time-sensitive rheological property of a polymerization product of the composition. The composition can be used to prepare a primary or secondary coating on an optical fiber or a matrix on a fiber optic ribbon.

The polymerizable base composition generally includes any combination of components which are capable of being polymerized, using conventional or later-developed curing methods, to prepare an optical fiber coating or ribbon matrix. Thus, the base composition can include any combination of oligomers and/or monomers plus any polymerization initiator, as desired. In one embodiment, the polymerizable base composition is substantially free of unsaturated epoxidized diene polymers, particularly those containing block copolymers of diolefin monomers alone or in combination with monoalkenyl aromatic hydrocarbon monomers. The individual components of the polymerizable base composition are discussed more fully hereinafter.

Any tackifier which produces the desired modification of rheological properties (of the polymerization product of a composition) can be utilized according to the present invention. The tackifier should be selected, at least in part, on the basis of its compatibility with the polymerizable base composition. Preferred tackifiers are those classified as a terpene base resin, coumarone base resin, petroleum resin, hydrogenated petroleum resin, styrene resin, phenol resins, or rosin base resin. Additional classes of suitable tackifiers are described by Schlademan, "Tackifier Resins," in *Handbook of Pressure Sensitive Adhesive Technology*, pp. 609–631 (Warwick, R.I.) (1999), which is hereby incorporated by reference.

The rosin base resins include unmodified rosin (e.g., wood, gum, or tall oil) and rosin derivatives. Rosin base resins can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

The terpene base resins include terpene polymers of α-pinene, β-pinene, dipentel, limonene, myrcene, bornylene and camphene, and phenol-modified terpene base resins obtained by modifying these terpene base resins with phenols.

The coumarone base resins include, for example, coumarone-indene resins and phenol-modified coumarone-indene resins.

Petroleum and hydrogenated petroleum resins include aliphatic petroleum resins, alicyclic petroleum resins, aromatic petroleum resins using styrene, α-methylstyrene, vinyltoluene, indene, methylindene, butadiene, isoprene, piperylene and pentylene as raw materials, and homopolymers or copolymers of cyclopentadiene. The petroleum resins are polymers using fractions having a carbon number of 5 to 9 as main components. Preferable petroleum resins include aliphatic hydrocarbon resins and hydrogenated polycyclodienic resins. A wide range of unsaturated cyclic monomers can be obtained from petroleum derivatives, such as, for example, cyclopentene derivatives, cyclopentadiene derivatives, cyclohexene derivatives, cyclohexadiene derivatives, and the like. Examples of hydrogenated polycyclodienic resins useful in the present invention are known with the trade name of ESCOREZ™ 5120, ESCOREZ™ 5380, ESCOREZ™ 5300, ESCOREZ™ 5320, all manufactured by Exxon Chemicals. A wide range of unsaturated monomers can be obtained from petroleum derivatives, such as, for example, ethylene derivatives, propylene derivatives, butadiene derivatives, isoprene derivatives, pentenes, hexanes, heptenes, and the like. Examples of aliphatic hydrocarbon resins useful in the present invention are known with the trade name of ESCOREZ™ 1304, ESCOREZ™ 1310, ESCOREZ™ 1315, all manufactured by Exxon Chemicals. Use of such petroleum base resins outside the field of optical fiber coatings is described, for example, in U.S. Pat. No. 5,643,655 to Passarino, which is hereby incorporated by reference.

The styrene base resins include homopolymers which are low molecular weight polymers comprising styrene as a principal component, and copolymers of styrene with, for example, α-methylstyrene, vinyltoluene, and butadiene rubber.

The phenol base resins include reaction products of phenols such as phenol, cresol, xylenol, resorcinol, p-tert-butylphenol, and p-phenylphenol with aldehydes such as formaldehyde, acetaldehyde and furfural, and rosin-modified phenol resins.

Of the suitable tackifiers, rosin derivatives and petroleum resins are preferred. Of the rosin derivatives, esterified rosins are most preferred, especially esterified abietic acid rosins. An exemplary abietic acid ester is UniTac R-40, available from Union Camp Corp. (Wayne, N.J.).

An effective amount of the tackifier, for purposes of modifying the time-sensitive rheological properties of coatings prepared according to the present invention, is about 0.1 to about 10.0 parts per hundred (pph), more preferably about 0.1 to about 5.0 pph, and even more preferably about 0.1 to about 1.0 pph.

As used herein, the weight percent of a particular component refers to the amount introduced into the polymerizable base composition, excluding the tackifier and additives. The amount of tackifier and additives that are introduced into the polymerizable base composition to produce a composition of the present invention is listed in parts per hundred. For example, an oligomer, monomer, and photoinitiator are combined to form the polymerizable base composition such that the total weight percent of these components equals 100 percent. To this polymerizable base composition, an amount of a suitable tackifier, for example 1.0 part per hundred, plus an amount of a suitable antioxidant, for example 1.0 part per hundred, is introduced in excess of the 100 weight percent of the polymerizable base composition.

The rheological properties of a polymerized product of the composition of the present invention determine whether the polymerized product will function as intended under particular stress rates. For optical fiber coatings, they are expected to experience both low stress rate conditions and high stress rate conditions over the expected lifetime of the optical fiber or fiber optic ribbon. High stress rate conditions are those at or above about 100 Hz and low stress rate conditions are those at or below about 1 Hz. Generally, stress rates intermediate these two extremes will be expected to cause the polymerization product to behave more or less as a glassy product or more or less as a rubbery product, depending on how close the applied stress rate is to either of these extremes. Of course, since the behavior of polymerization products prepared from the compositions of the present invention is temperature-dependent, temperatures approaching the $T_g$ of the polymerization product (i.e., at the time the stress is applied) will significantly affect whether the product has glassy or rubbery attributes.

The oligomeric component of the polymerizable base composition can include a single type of oligomer or it can be a combination of two or more oligomers. When employed, if at all, the oligomer is preferably an ethylenically unsaturated oligomer. Suitable oligomers can be either monofunctional oligomers or polyfunctional oligomers, although polyfunctional oligomers are preferred. The oligomeric component can also be a combination of a monofunctional oligomer and a polyfunctional oligomer. Oligomers employed in the compositions of the present invention can contain acrylate, methacrylate, acrylamide, N-vinyl amide, styrene, vinyl ether, vinyl ester, or other known functional groups on a polyether-, polyester-, polycarbonate-, polyamide-, polyurethane-, or polyurea-diisocyanate backbone. Exemplary oligomers of this type are described in U.S. Provisional Patent Application Ser. No. 60/173,874, entitled "Secondary Coating Composition For Optical Fibers" to Sheng, filed Dec. 30, 1999, and U.S. patent application Ser. No. 09/301,814 to Fewkes et al., filed Apr. 29, 1999, which are hereby incorporated by reference.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system. Polycarbonate components can also be incorporated in oligomers prepared by these methods.

In the composition of the present invention, the monomeric component of the polymerizable base composition can include a single monomer or it can be a combination of two or more monomers. Although not required, it is preferable that the monomeric component be a combination of two or more monomers when the composition is substantially devoid of an oligomeric component. Preferably, the monomer is an ethylenically unsaturated monomer.

Ethylenically unsaturated monomers may contain various functional groups which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

Exemplary monomers of this type are described in U.S. Provisional Patent Application Ser. No. 60/173,874, entitled "Secondary Coating Composition For Optical Fibers" to Sheng, filed Dec. 30, 1999, and U.S. Pat. No. 6,316,516 to Fewkes et al., filed Apr. 29, 1999, which are hereby incorporated by reference.

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Most suitable monomers are either commercially available or readily synthesized using reaction schemes known in the art. For example, most monofunctional monomers can be synthesized by reacting an appropriate alcohol or amide with an acrylic acid or acryloyl chloride according to synthesis schemes known in the art.

As is well known, optical fiber coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, should provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 μm is, e.g., less than 1.0 J/cm$^2$, preferably less than 0.5 J/cm$^2$.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Duracure 4265, Ciba Specialty Chemical), 2-hydroxy-2-methyl-1-phenylpropane-1-one (e.g., in commercial blend Duracure 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the coating compositions of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

With respect to primary coating compositions of the present invention, it also desirable for the composition to include an adhesion promoter which facilitates adhesion between the primary coating and the underlying fiber. A number of suitable adhesion promoters have been described in the art, including acid-functional materials and organo-functional silanes. Of these, organofunctional silanes are preferred, because they are less corrosive and they tend to better maintain their adhesive properties. Suitable organofunctional silanes which have been described in the art include, generally, amino-functional silanes, mercapto-functional silanes, methacrylate-functional silanes, acrylamido-functional silanes, allyl-functional silanes, vinyl-functional silanes, and acrylate-functional silanes. Exemplary organofunctional silanes are disclosed in U.S. Pat. No. 5,146,531 to Shustack, which is hereby incorporated by reference.

Particularly preferred adhesion promoters for primary coatings include bis(trimethoxysilylethyl)benzene and bis(triethoxysilylethyl)benzene, as disclosed in U.S. Pat. No. 6,316,516 to Fewkes et al., filed Apr. 29, 1999, which is hereby incorporated by reference. Bis(trimethoxysilylethyl)benzene is commercially available from Gelest (Tellytown, Pa.) and United Chemical Technologies, Inc. (Bristol, Pa.). Bis(triethoxysilylethyl)benzene can be synthesized from bis(trimethoxysilylethyl)benzene by trans-esterification with ethanol in a manner known in the art.

For secondary and matrix coatings, a preferred adhesion promoter is an acrylated acid adhesion promoter such as Ebecryl 170 (available from UCB Radcure (Smyrna Ga.)).

A preferred antioxidant is thiodiethylene bis(3,5-di-tert-butyl)-4-hydroxyhydrocinnamate (e.g., Irganox 1035, available from Ciba Specialty Chemical).

Other suitable materials for use in primary and secondary coating materials, as well as considerations related to selection of these materials, are well known in the art and are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

Another aspect of the present invention relates to an optical fiber that includes a fiber and at least one coating encapsulating the fiber, wherein the at least one coating is the polymerization product of a composition according to the present invention. The at least one coating can be either a primary coating, a secondary coating, or both.

One embodiment of this aspect of the present invention is shown in FIG. 1. The optical fiber 10 includes a glass fiber that contains a core 12 and a cladding layer 14. Encapsulating the fiber is a primary coating material 16 and a secondary coating 18. Although it may be desirable in some instances to only provide a primary coating material 16, most conventional optical fibers contain at least two coatings.

Basically, an optical fiber of the present invention can be prepared using standard methods in combination with a composition of the present invention. Briefly, the process involves fabricating a glass fiber (core 12 and cladding layer 14), applying a primary coating composition to the glass fiber, polymerizing the primary coating composition to form the primary coating material 16, applying a secondary coating composition to the coated glass fiber, and polymerizing the secondary coating composition to form the secondary coating material 18. This is known as a wet-on-dry coating process. Optionally, the secondary coating composition can be applied to the coated fiber before polymerizing the primary coating composition, in which case only a single polymerization step is employed. This is known as a wet-on-wet coating process.

The core and cladding layer are typically produced in a single operation by methods which are well known in the art. Suitable methods include: the double crucible method as described, for example, in Midwinter, *Optical Fibers for Transmission*, New York, John Wiley, pp. 166–178 (1979), which is hereby incorporated by reference; rod-in-tube procedures; and doped deposited silica processes, also commonly referred to as chemical vapor deposition ("CVD") or vapor phase oxidation. A variety of CVD processes are known and are suitable for producing the core and cladding layer used in the optical fibers of the present invention. They include external CVD processes (Blakenship et al., "The Outside Vapor Deposition Method of Fabricating Optical Waveguide Fibers," *IEEE J. Quantum Electron.*, 18:1418–1423 (1982), which is hereby incorporated by reference), axial vapor deposition processes (Inada, "Recent Progress in Fiber Fabrication Techniques by Vapor-phase Axial Deposition," *IEEE J. Quantum Electron.* 18:1424–1431 (1982), which is hereby incorporated by reference), and modified CVD or inside vapor deposition (Nagel et al., "An Overview of the Modified Chemical Vapor Deposition (MCVD) Process and Performance," *IEEE J. Quantum Electron.* 18:459–476 (1982), which is hereby incorporated by reference). Any variation of these or other known methods can also be employed.

The primary and secondary coating compositions are coated on a glass fiber using conventional processes, for example, on a draw tower.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary and optional secondary coating compositions are applied to the glass fiber after it has been drawn from the preform, preferably immediately after cooling (i.e., wet-on-wet). The coating compositions are then cured simultaneously to produce the coated optical fiber. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary coating composition can be applied and cured to form the primary coating material 16, then the secondary coating composition(s) can be applied and cured to form the secondary coating material 18 (i.e., wet-on-dry).

Still another aspect of the present invention relates to a fiber optic ribbon. The ribbon includes a plurality of substantially planar, substantially aligned optical fibers and a matrix encapsulating the plurality of optical fibers. The plurality of optical fibers can contain a coating prepared from a composition of the present invention, as described above, or the plurality of optical fibers can be conventional fibers which are coated by a matrix material that is the cured product of a composition of the present invention.

Figure 2:
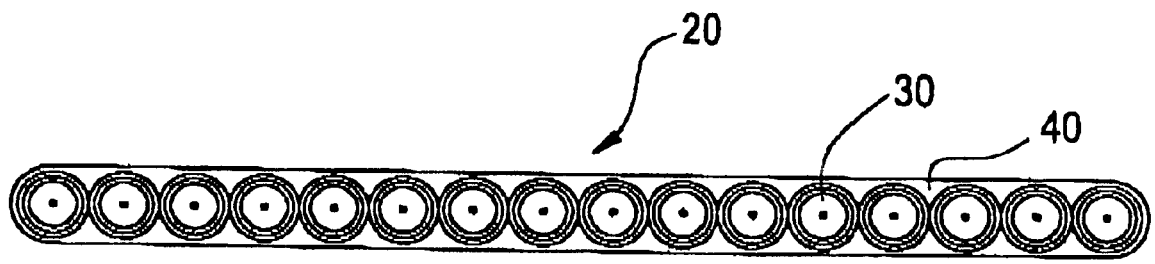
FIG. 2 is a cross-sectional view of a fiber optic ribbon of the present invention.

One embodiment of this aspect of the present invention is illustrated in FIG. 2. As shown, a fiber optic ribbon 20 of the present invention includes a plurality of single or multi-layered optical fibers 30 substantially aligned relative to one another in a substantially planar relationship and encapsulated by matrix 40. By substantially planar, it is intended that optical fibers 30 are not displaced from a common plane by a distance of more than about one-half the diameter thereof. By substantially aligned, it is intended that the optical fibers 30 are generally parallel with other optical fibers along the length of the fiber optic ribbon 20. In FIG. 2, the fiber optic ribbon 20 contains sixteen (16) optical fibers 30; however, it should be apparent to those skilled in the art that any number of optical fibers 30 (e.g., two or more) may be employed to form fiber optic ribbon 20 disposed for a particular use.

The fiber optic ribbons of the present invention may be encapsulated by the matrix 40 in any known configuration (e.g., edge-bonded ribbon, thin-encapsulated ribbon, thick-encapsulated ribbon, or multi-layer ribbon) by conventional methods of making fiber optic ribbons.

Basically, the fiber optic ribbon is prepared by standard methods using the composition of the present invention applied to the individual optical fibers and/or used to form the matrix. For example, upon alignment of a plurality of substantially planar optical fibers, the composition of the present invention can be applied and cured according to the methods of preparing optical fiber ribbons as described in U.S. Pat. No. 4,752,112 to Mayr and U.S. Pat. No. 5,486,378 to Oestreich et al., which are hereby incorporated by reference.

Although not shown, one of skill in the art should readily appreciate that fibers of the present invention can be utilized in fiber bundles, such as blown fiber subunits, which contain a plurality of substantially aligned optical fibers and a matrix encapsulating the plurality of optical fibers. Fiber bundles differ from ribbons by lacking a substantially planar arrangement of the plurality of optical fibers therein. An exemplary construction of such subunits is disclosed in U.S. Pat. No. 5,046,815 to Cain et al., which is hereby incorporated by reference.

A further aspect of the present invention relates to a method of modifying a time-sensitive rheological property of an optical fiber coating. This method includes introducing into a polymerizable composition a tackifier in an amount effective to modify a time-sensitive rheological property of the polymerization product of the polymerizable composition. The polymerizable composition can be a primary coating composition, a secondary coating composition, or a matrix composition. Once the composition has been prepared, it can then be coated onto a fiber and cured, as described above, to yield an optical fiber or fiber optic ribbon of the present invention. Coatings prepared from compositions of the present invention possess modified time-sensitive rheological properties as compared to conventional fibers possessing coatings prepared from compositions absent the tackifier.

Another aspect of the present invention relates to a method of improving the strippability of one or more coating materials from an optical fiber. The method includes introducing an effective amount of a tackifier into a polymerizable composition and then preparing an optical fiber which contains a fiber encapsulated by a coating, where the coating is the polymerization product of the polymerizable composition (i.e., a composition of the present invention). In this case, the composition contains an amount of a tackifier effective to improve the strippability of the coating from the fiber. Since this aspect of the present invention is applicable to fiber optic ribbons as well as individual optical fibers, this method of the present invention can also include preparing a fiber optic ribbon containing a plurality of substantially aligned, substantially planar optical fibers encapsulated by a matrix material, where each of the plurality of optical fibers includes a fiber encapsulated by a coating which is the polymerization product of a composition of the present invention.

Whether the stripped fiber or ribbon (i.e., containing a plurality of fibers) is suitable for its intended use depends upon the strip cleanliness of the exposed fiber(s). While the strip cleanliness will vary according to the needs, it is generally desirable for a stripped fiber(s) to have a cleanliness rating of three or less. It has been previously observed that one significant source of debris on stripped fibers is the primary coating, which can be broken apart during the stripping process. The stripping process may result in a stripped fiber that contains an undesirable amount of debris (regardless of its source), which must be removed, for example, by wiping the stripped; fibers with an alcohol-moistened cloth. Unfortunately, with more debris, it is often necessary to wipe the fibers more than once. Thus, correcting the problem requires additional labor, time, and cost, and it may result in damage to the stripped fiber. The present invention overcomes this deficiency by providing coatings with improved strippability.

A further aspect of the present invention relates to a method of improving the processing characteristics of a coating material during preparation of an optical fiber. This method includes introducing an amount of a tackifier into a polymerizable composition and then preparing an optical fiber which contains a fiber encapsulated by a coating, where the coating is the polymerization product of the polymerizable composition (i.e., a composition of the present invention). In this case, the composition contains an amount of a tackifier which is effective to reduce the occurrence of coating failure during preparation of the optical fiber. This method is particularly important during wet-on-dry coating processes, described above, where a coating material is cured prior to application of a subsequent coating material. For example, during application of the secondary coating to a previously coated fiber that contains a primary coating, the secondary coating composition is applied to the coated fiber as it is drawn through a die. The high stress rate applied to the primary coating as the fiber is drawn through the die can disrupt (i.e., tear) the primary coating, resulting in the production of an inferior optical fiber that possesses a non-uniform diameter along its length. Therefore, it is desirable to prevent or at least minimize the disruption of primary coatings during processing of optical fibers.

A further aspect of the present invention relates to a method of reducing the occurrence of microbending during handling or use of an optical fiber. This method includes introducing an amount of a tackifier into a polymerizable composition and then preparing an optical fiber which contains a fiber encapsulated by a coating, where the coating is the polymerization product of the polymerizable composition (i.e., a composition of the present invention). In this case, the composition contains an amount of a tackifier which is effective to reduce the occurrence of microbending.

EXAMPLES

The following examples are provided to illustrate embodiments of the present invention, but they are by no means intended to limit its scope.

Example 1

Preparation of Primary Coating Compositions

A number of compositions of the present invention were prepared with the components listed in Table 1 below using commercial blending equipment. The oligomer and monomer components were weighed and then introduced into a heated kettle and blended together at a temperature within the range of from about 50° C. to 65° C. Blending was continued until a homogenous mixture was obtained. Next, the photoinitiator and tackifier were individually weighed and separately introduced into the homogeneous solution while blending. Any additives were weighed and then introduced into the solution while blending. Blending was continued until a homogeneous solution was again obtained.

TABLE 1

Primary Coating Compositions

| Composition | Component | Content |
|---|---|---|
| A (Control) | SR-504 | 45.0 wt % |
| | BR-3731 | 52.0 wt % |
| | Irgacure 1850 | 3.0 wt % |
| | Tegorad 2200 | 0.5 pph |
| | Irganox 1035 | 1.0 pph |
| | 3-mercaptopropyltrimethoxysilane | 1.0 pph |
| B (Test) | SR-504 | 45.0 wt % |
| | BR-3731 | 52.0 wt % |
| | Irgacure 1850 | 3.0 wt % |
| | Tegorad 2200 | 0.5 pph |
| | Irganox 1035 | 1.0 pph |
| | 3-mercaptopropyltrimethoxysilane | 1.0 pph |
| | UniTac R-40 | 1.0 pph |
| C (Test) | SR-504 | 45.0 wt % |
| | BR-3731 | 52.0 wt % |
| | Irgacure 1850 | 3.0 wt % |
| | Tegorad 2200 | 0.5 pph |
| | Irganox 1035 | 1.0 pph |
| | bis(trimethoxysilylethyl) benzene | 1.0 pph |
| | UniTac R-40 | 1.0 pph |
| D (Control) | BR-3741 | 62.0 wt % |
| | Photomer 4003 | 15.0 wt % |
| | Tone M-100 | 20.0 wt % |
| | Irgacure 1850 | 3.0 wt % |
| | Irganox 1035 | 1.0 pph |
| | bis(trimethoxysilylethyl) benzene | 1.0 pph |
| | Tegorad 2200 | 0.5 pph |

TABLE 1-continued

Primary Coating Compositions

| Composition | Component | Content |
|---|---|---|
| E (Test) | BR-3741 | 62.0 wt % |
| | Photomer 4003 | 15.0 wt % |
| | Tone M-100 | 20.0 wt % |
| | Irgacure 1850 | 3.0 wt % |
| | Irganox 1035 | 1.0 pph |
| | bis(trimethoxysilylethyl) benzene | 1.0 pph |
| | Tegorad 2200 | 0.5 pph |
| | UniTac R-40 | 1.0 pph |
| F (Control) | SR-504 | 45.0 wt % |
| | BR-3731 | 52.0 wt % |
| | Irgacure 1850 | 3.0 wt % |
| | Tegorad 2200 | 0.5 pph |
| | Irganox 1035 | 1.0 pph |
| | bis(trimethoxysilylethyl) benzene | 1.0 pph |
| G (Control) | SR-504 | 25.0 wt % |
| | BR-3731 | 52.0 wt % |
| | Tone M-100 | 20.0 wt % |
| | Irgacure 1850 | 3.0 wt % |
| | Tegorad 2200 | 0.5 pph |
| | Irganox 1035 | 1.0 pph |
| | 3-mercaptopropyltrimethoxysilane | 1.0 pph |
| | Acclaim 3201 | 1.0 pph |

Of the components listed above, BR-3731 is a polyether urethane acrylate oligomer available from Bomar Specialty Co. (Winsted, Conn.), BR-3741 is a polyether urethane acrylate oligomer available from Bomar Specialty Co., SR-504 is an ethoxylated nonylphenol acrylate monomer available from Sartomer Company, Inc. (Westchester, Pa.), Photomer 4003 is a ethoxylated nonylphenol acrylate monomer available from Henkel Corp. (Ambler, Pa.), Tone M-100 is a caprolactone acrylate available from Union Carbide Corp. (Danbury, Conn.), Irgacure 1850 is a photoinitiator blend of 1-hydroxycyclohexylphenyl ketone and bis(2,6-dimethoxybenzoyl)-2,4,4-trimethylpentylphosphine oxide available from Ciba Specialty Chemical (Tarrytown, N.Y.), Irganox 1035 is a thiodiethylene bis(3,5-di-tert-butyl-4-hydroxy)hydrocinnamate anti-oxidant available from Ciba Specialty Chemical, and Tegorad 2200 is an acrylated polyalkoxypolysiloxane carrier available from Goldschmidt Chemical Co. (Hopewell, Va.), bis(trimethoxysilylethyl) benzene and 3-mercaptopropyltrimethoxysilane are adhesion promoters, UniTac R-40 is an esterified tall oil rosin tackifier available from Union Camp Corp. (Wayne, N.J.), and Acclaim 3201 is a poly(ethylene oxide-co-polypropylene oxide) available from Lyondell (Newton Square, Pa.).

After thoroughly blending, the solution was tested for its viscosity at 45° C., and the solution was examined under optical microscope for the presence of particles, crystals, and phase separation. Each composition was satisfactory in each respect.

After preparing and examining the compositions, they were then applied to a solid surface at a thickness of about 5 mm and cured with ultraviolet radiation at a dose level of about 0.25 to 1.0 J/cm$^2$ using a D bulb available from Fusion UV Systems, Inc. (Gaithersburg, Md.). The resulting coating materials were then tested for strength using procedures set forth in ASTM D882-97 (which is hereby incorporated by reference), except that a fixed strain rate of 2.5 cm/minute was employed under environmental conditions of 23° C. and 50% relative humidity. The results of these tests are listed in Table 2 below.

TABLE 2

Properties of Primary Coating Materials

| | Elongation (%) | Tensile Strength (Mpa) | Young's Modulus (Mpa) |
|---|---|---|---|
| A | 185 | 0.75 | 0.83 |
| B | 165 | 0.92 | 1.11 |
| C | — | — | — |
| D | 143 | 0.49 | 0.69 |
| E | 141 | 0.39 | 0.60 |

In comparing the polymerization products of compositions A and B, it is apparent that the tackifier contributed to an increase in tensile strength and modulus, and a concomitant decrease in the elongation prior to breakage of the film. Under these conditions, the tackifier had the effect of making the polymerization product behave more glassy.

In comparing the polymerization products of compositions D and E, it is apparent that the tackifier contributed to an decrease in tensile strength and modulus, and a modest decrease in the elongation prior to breakage of the film. Without being bound by any particular theory, it is believed that these results were dependent upon an interaction between the tackifier and the particular oligomers utilized in coating E.

Example 2

Preparation of Optical Fibers and Ribbons and Analysis of Fiber Strip Cleanliness Once compositions were prepared, primary and secondary coating materials were applied to drawn glass fibers subsequent to cooling. A glass fiber, having a diameter of about 125 μm, was introduced into a container of one of the compositions A, B, or C as listed in Table 1. As the coated fiber was removed from the container, the thickness of the primary coating composition was adjusted to about 32.5 μm by passing the coated fiber through a die. The coated fiber was then cured with ultraviolet radiation at a dose level of about 0.25 to 1.0 J/cm$^2$ using a D bulb (Fusion UV Systems, Inc.). After curing, each coated fiber was drawn through a second coating container holding a secondary coating composition, as follows:

| Secondary Coating Composition 1 | |
|---|---|
| CN983 | 30 wt % |
| BR571 | 22 wt % |
| SR344 | 16 wt % |
| SR602 | 14 wt % |
| SR9020 | 14 wt % |
| Irgacure 651 | 1 wt % |
| Irgacure 1850 | 3 wt % |
| Irganox 1035 | 0.5 pph |

Of the components listed for secondary coating composition 1, CN983 is a polyester urethane acrylate oligomer available from Sartomer Co., Inc., BR571 is an aliphatic urethane acrylate from Bomar Specialty Co., SR344 is a polyethylene glycol(400) diacrylate monomer available from Sartomer Co., Inc., SR602 is a ethoxylated(10) bisphenol A diacrylate monomer available from Sartomer Co., Inc., SR 9020 is a propoxylated(3) glyceryl triacrylate available from Sartomer Co., Inc., Irgacure 651 is a 2,2-dimethoxy-2-phenyl acetophenone adhesion promoter available from Ciba Specialty Chemical, and Irganox 1035 is a thiodiethylene bis (3,5-di-tert-butyl-4-hydroxy)hydrocinnamate anti-oxidant available from Ciba Specialty Chemical.

As the coated fiber was removed from the second coating chamber, the thickness of the secondary coating composition was adjusted to about 27.5 μm by passing the coated fiber through a die. The coated fiber was then cured with ultraviolet radiation at a dose level of about 0.25 to 1.0 J/cm$^2$ using a D bulb (Fusion UV Systems, Inc.) to produce an optical fiber having a diameter of about 245±10 μm.

For purposes of clarity, optical fibers coated by primary composition A and secondary coating composition 1 are hereinafter referred to as fiber A1, fibers coated by composition B and secondary coating composition 1 are hereinafter referred to as fiber B1, and so on. Similarly, any ribbons prepared with fibers A1, B1, or C1 are hereinafter referred to as ribbon A1, B1, or C1, respectively.

Fibers A1, B1, and C1, after aging for two to three weeks, were then used to prepare a twelve-fiber ribbon. These fibers were coated with a ultraviolet-curable ink and then run through an alignment die of a conventional ribbon making device. After the twelve fibers were substantially aligned, the fibers were coated with an ultraviolet-curable matrix composition and then exposed to ultraviolet radiation at a dose level of about 0.25 to 1.0 J/cm$^2$.

After preparing ribbons A1, B1, and C1, the ribbons were subjected to stripping operations using a heated ribbon stripper available from Sumitomo Electric Industries, Ltd., Osaka, Japan. Each ribbon was stripped at 70° C. and 100° C. After stripping ribbons A, B, and C, stripped fibers in the ribbons were examined for debris.

As described above, a score of one (1) identifies a fiber having a low amount of debris on its surface and a score of five (5) represents a fiber having a significant amount of debris on its surface. Any score of three (3) or less was deemed to be acceptable strip cleanliness. Cleanliness measurements were obtained by visually inspecting the stripped fibers under a lighted 2×magnifier. Particles remaining on the stripped fibers were counted and ribbons were assigned a score according to the cleanliness standard shown in Table 3 below:

TABLE 3

Cleanliness Standard

| Number of Particles | Cleanliness Rating |
| --- | --- |
| 0 | 1 |
| 1–10 | 1.5 |
| 11–20 | 2 |
| 21–30 | 2.5 |
| 31–40 | 3 |
| >40 | 3.5 |
| >40 and needs extra cleaning | 4 |
| >40 and extra cleaning ineffective | 5 |

The results of the stripping tests are shown in Table 4 below:

TABLE 4

Strip Cleanliness of Ribbons

| | Stripping at 70° C. | Stripping at 100° C. |
| --- | --- | --- |
| A1 | 3.5 | 3.5 |
| B1 | 3.0 | 4.0 |
| C1 | 2.5 | 3.5 |

Ribbons B1 and C1 both demonstrated better strip cleanliness ratings at 70° C. However, all three demonstrated substantially the same results when stripped at 100° C. (i.e., the distinction between 3.5 and 4.0 is based on the need for further cleaning rather than particle number per se). Despite the similarity of response under 100° C. stripping conditions, it was observed that the actual size of the adhered particles was greatly reduced in ribbons B1 and C1, as compared to ribbon A1.

During the stripping operation, a force is first generated normal to the glass fibers of the ribbon as the blades on the stripping tool compress through the matrix and coatings of the ribbon. A second force is then applied substantially parallel to the axis of glass fiber, resulting in propagation of a crack along the boundary between the primary coating and the glass fiber. This causes separation of the coatings from the individual fibers. As the coating materials are being removed from the glass fibers, a frictional force also exists in a direction opposite to the direction of the second force. Without being bound by any theory, it is believed that the tackifier modifies the rheological properties of the composition under the high stress rate of the stripping operation to render the primary coating more glassy, thus yielding better strip cleanliness at the lower temperature. See "Mechanical Properties of Polymer Solids and Liquids," in *The Elements of Polymer Science and Engineering*, Ch. 11, New York, (1982), which is hereby incorporated by reference.

Example 3

Water Soak Evaluation of Fibers B1 and C1 for Delamination or Micro-delamination Fibers B1 and C1, after aging for about two to three weeks, were soaked in water at room temperature and at a temperature of about 65° C. for a duration of either 14 days, 30 days, or 60 days. The length of tested fiber must be sufficiently long to allow the ends of the fiber to remain above the water surface while soaking, which limits any effect of the water to radial penetration of the coating(s). Following the pre-determined soaking time, each sample was examined by microscopic analysis at 100× magnification of 10 cm sections of the optical fiber for the presence of delamination sites (i.e., large areas of separation between the primary coating and the glass fiber) or sites of micro-delamination ("MD"). The frequency and the size of the MD are counted and reported as the number of MD per 10 cm section examined. The results of the examination are shown in Table 5 below.

TABLE 5

Results of Soak Test for Fibers B1 and C1

| | Room Temperature Soak | | | 65° C. Soak | | |
| --- | --- | --- | --- | --- | --- | --- |
| | 14 day | 30 day | 60 day | 14 day | 30 day | 60 day |
| B1 | No MD | No MD | No MD | No MD | No MD | — |
| C1 | No MD | No MD | No MD | No MD | No MD | — |

Both fibers B1 and C1 possessed exceptional resistance to water-induced degradation of the coating system.

Example 4

Fiber Draw Performance Using Compositions D and E

Once compositions were prepared, primary and secondary coating materials were applied to drawn glass fibers subsequent to cooling. A glass fiber, having a diameter of about 125 μm, was introduced into a container of one of the compositions D or E as listed in Table 1. As the coated fiber was removed from the container, the thickness of the primary coating composition was adjusted to about 32.5 μm by passing the coated fiber through a die. The coated fiber was then cured with ultraviolet radiation at a dose level of about 0.25 to 1.0 J/cm$^2$ using a D bulb (Fusion UV Systems, Inc.). After curing, the coated fiber was then drawn through a second coating container holding a secondary coating composition, as follows:

| Secondary Coating Composition 2 | |
|---|---|
| KWS-4131 | 10 wt % |
| Ph-4028 | 50 wt % |
| RCC 12-984 | 37 wt % |
| Irgacure 1850 | 3 wt % |
| Irganox 1035 | 0.5 pph |

Of the components listed for the secondary coating composition, KWS-4131 is a polyether-based urethane diacrylate oligomer available from Bomar Specialty Corp., Ph-4028 is an ethoxylated(4) bisphenol A diacrylate monomer available from Henkel Corp., RCC 12-984 is a ethoxylated(3) bisphenol A diacrylate monomer available from Henkel Corp, Irgacure 1850 is an adhesion promoter blend of 1-hydroxycyclohexylphenyl ketone and bis(2,6-dimethoxybenzoyl)-2,4,4-trimethylpentyl phosphine oxide available from Ciba Specialty Chemical, and Irganox 1035 is a thiodiethylene bis(3,5-di-tert-butyl-4-hydroxy) hydrocinnamate anti-oxidant available from Ciba Specialty Chemical.

As the coated fiber was removed from the second chamber, the thickness of the secondary coating composition was adjusted to about 27.5 μm by passing the coated fiber through a die. The coated fiber was then cured with ultraviolet radiation at a dose level of about 0.25 to 1.0 J/cm$^2$ using a D bulb (Fusion UV Systems, Inc.) to produce an optical fiber having a diameter of about 245±10 μm.

During preparation of fiber D2 using a draw speed in excess of 20 m/s, numerous "lump and neck" deformations occurred, as evidenced by characteristic alternating increased- and decreased-thickness fiber diameters. Without being bound by any one theory, it is believed that the defects arise from the relatively low modulus primary coating being deformed as it passes through the secondary coating block (i.e., die).

During preparation of fiber E2, also using a draw speed in excess of 20 m/s, no lump and neck deformations occurred. This is quite surprising given that polymerization product of composition E possessed a lower modulus than the polymerization product of composition D under load cell conditions (see Table 2).

An approximately two meter length piece of each optical fiber was removed from draw spools prior to rewinding. Each piece of fibers D2 and E2 was then examined under a microscope at 200×magnification. Fiber D2 showed severe abrasions of the primary coating surface, whereas fiber E2 possessed no appreciable surface defects of the primary coating.

Example 5

Optical Fiber Durability Using Fibers D2 and E2

Fibers D2 and E2 were separately coiled about a platen and then subjected to extremely cold temperatures, either cooling for 24 hours in dry ice or cooling for 3 hours in liquid nitrogen. The number of defects in the primary coating, per meter of fiber, was examined both before and after cooling. The two types of defects which were counted were: (1) delamination between the glass fiber and the primary coating, and (2) tears within the primary coating. The results are shown in Table 6 below:

TABLE 6

Optical Fiber Durability for Fibers D2 and E2

| | Dry Ice | | Liquid Nitrogen | |
|---|---|---|---|---|
| | Before Cooling (defects/m) | After Cooling (defects/m) | Before Cooling (defects/m) | After Cooling (defects/m) |
| D2 | 218 | 757 | 192 | 673 |
| E2 | 7 | 14 | 5 | 99 |

As demonstrated with the above test data, fibers prepared with a composition of the present invention were better able to withstand cold environments without causing defects in the primary coating. It should be noted, however, that resistance against defect development is not in any way limited to the defects detected herein.

Example 6

Microbend Resistance Analysis

Fibers were prepared substantially as described in Example 2 using primary coating composition C, F, and G (see Table 1) and either secondary coating composition 2 (see Example 4) or the secondary coating compositions set forth below:

| Secondary Coating Composition 3 | |
|---|---|
| BR-301 | 10 wt % |
| Ph-4028 | 40 wt % |
| Ph-4025 | 17 wt % |
| RCC 12-984 | 30 wt % |
| Irgacure 1850 | 3 wt % |
| Irganox 1035 | 0.5 pph |
| Secondary Coating Composition 4 | |
| RCC 12-892 | 10 wt % |
| Ph-4028 | 35 wt % |
| Ph-4025 | 12 wt % |
| RCC 12-984 | 40 wt % |
| Irgacure 1850 | 3 wt % |
| Irganox 1035 | 0.5 pph |

Of the components listed above, BR301 is an aromatic urethane oligomer available from Bomar Specialty Co., RCC 12-892 is a multi-functional aliphatic urethane acrylate oligomer available from Henkel Corp., Ph-4025 is an ethoxylated(8) bisphenol A diacrylate monomer available from Henkel Corp., Ph-4028 is an ethoxylated(4) bisphenol A diacrylate monomer available from Henkel Corp., RCC 12-984 is a ethoxylated(3) bisphenol A diacrylate monomer available from Henkel Corp, Irgacure 1850 is an adhesion promoter blend of 1-hydroxycyclohexylphenyl ketone and bis(2,6-dimethoxybenzoyl)-2,4,4-trimethylpentyl phosphine oxide available from Ciba Specialty Chemical, and Irganox 1035 is a thiodiethylene bis(3,5-di-tert-butyl-4-hydroxy) hydrocinnamate anti-oxidant available from Ciba Specialty Chemical.

After aging fibers C2, C3, C4, F2, F3, F4, G2, G3, and G4 for two to three weeks, the fiber segments were subjected to compressive lateral loading against a wire mesh. Microbend susceptibility of the fibers was detected by measuring attenuation at 1310 nm, 1550 nm, and 1625 nm. All samples were measured for mode-field diameter and effective area on the single mode reference bench. The results of this test are shown in Table 7 below:

TABLE 7

Microbending Induced Attenuation

| Fiber | Mode-Field Diameter (μm) | 1310 nm | 70–30 N (dB/m ± 2σ) 1550 nm | 1625 nm |
|---|---|---|---|---|
| C2 | 10.85 | 0.05 ± 0.019 | 0.13 ± 0.045 | 0.20 ± 0.063 |
| C3 | 10.92 | 0.03 ± 0.015 | 0.08 ± 0.033 | 0.12 ± 0.056 |
| C4 | 10.86 | 0.05 ± 0.050 | 0.16 ± 0.134 | 0.27 ± 0.195 |
| Avg. |  | 0.04 | 0.12 | 0.20 |
| F2 | 10.66 | 0.12 ± 0.072 | 0.27 ± 0.166 | 0.36 ± 0.216 |
| F3 | 10.95 | 0.10 ± 0.105 | 0.28 ± 0.191 | 0.36 ± 0.262 |
| F4 | 10.81 | 0.03 ± 0.008 | 0.07 ± 0.007 | 0.12 ± 0.038 |
| Avg. |  | 0.08 | 0.21 | 0.28 |
| G2 | 10.81 | 0.16 ± 0.121 | 0.35 ± 0.157 | 0.45 ± 0.211 |
| G3 | 10.94 | 0.11 ± 0.063 | 0.37 ± 0.252 | 0.55 ± 0.273 |
| G4 | 10.89 | 0.15 ± 0.110 | 0.39 ± 0.173 | 0.50 ± 0.270 |
| Avg. |  | 0.14 | 0.37 | 0.50 |

Figure 3:
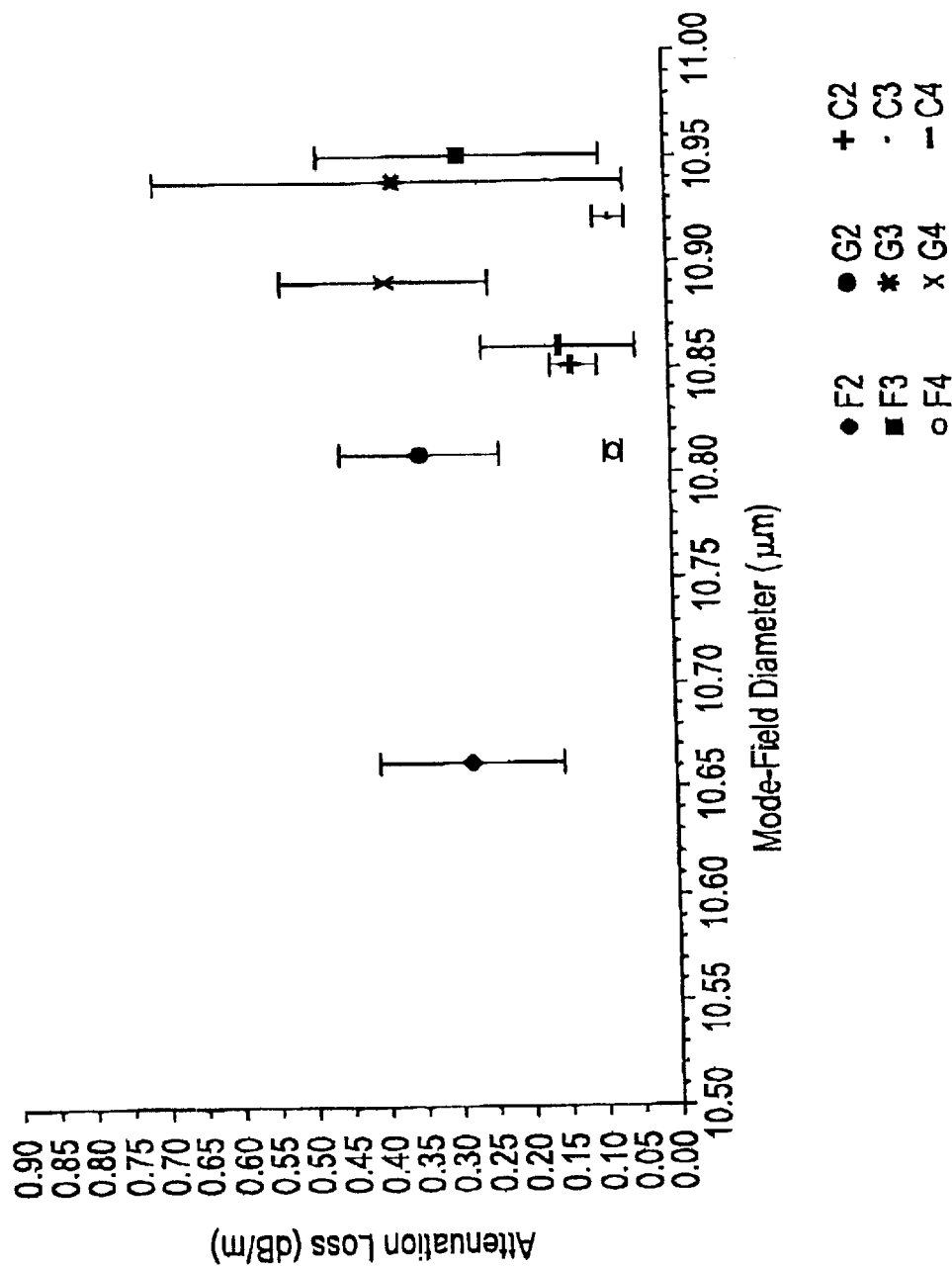
FIG. 3 is an attenuation loss (dB/m) versus mode-field diameter ($\mu$m) plot for fibers subjected to compressive lateral loading against a wire mesh.

While all of the fibers exhibited better resistance to microbend-induce attenuation loss as compared to conventional fibers (data not shown), primary coating C consistently yielded fibers with the greatest resistance to attenuation loss regardless of the secondary coating. This is reflected in FIG. 3, which is an attenuation loss versus mode-field diameter plot for the fibers shown in Table 7.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An optical fiber comprising:
   a fiber core and
   at least one coating encapsulating the fiber core, wherein the at least one coating is a polymerization product of a polymerizable composition substantially free of unsaturated epoxidized diene polymers, the polymerizable composition comprising at least one ethylenically unsaturated monomer and optionally at least one oligomer, and a tackifier present in an amount effective to modify a time-sensitive rheological property of a polymerization product of the composition, said tackifier being selected from the group consisting of terpene based resins, coumarone based resins, phenol resins, and rosin based resins.

2. The optical fiber according to claim 1, wherein the at least one coating comprises a primary coating and the fiber further comprises an acrylate based secondary coating.

3. The optical fiber according to claim 1 wherein said tackifier comprises a rosin based resin.

4. The optical fiber according to claim 3 wherein said rosin based resin comprises an esterfied tall oil rosin.

5. An optical fiber ribbon or bundle comprising:
   a plurality of substantially aligned optical fibers according to claim 1 and
   a matrix encapsulating the plurality of optical fibers.

6. An optical fiber ribbon or bundle comprising:
   a plurality of substantially aligned optical fibers and
   a matrix encapsulating the plurality of optical fibers, wherein the matrix is the polymerization product of a polymerizable composition substantially free of unsaturated epoxidized diene polymers, the polymerizable composition comprising at least one ethylenically unsaturated monomer and optionally at least one oligomer, and a tackifier present in an amount effective to modify a time-sensitive rheological property of a polymerization product of the composition.

7. A method of improving the strippability of one or more coating materials from an optical fiber, said method comprising:
   preparing an optical fiber comprising fiber encapsulated by a coating, the coating being a polymerization product of a polymerizable composition substantially free of unsaturated epoxidized diene polymers, the polymerizable composition comprising an amount of a tackifier effective to improve the strippability of the coating from the fiber core, said tackifier being selected from the group consisting of terpene based resins, coumarone based resins, petroleum resins, hydrogenated petroleum resins, styrene resins, phenol resins, and rosin based resins.

8. The method according to claim 7, wherein the tackifier is present in an amount between about 0.1 and about 10.0 parts per hundred of the polymerizable base composition.

9. The method according to claim 8, wherein the tackifier is present in amount between about 0.1 and about 1.0 parts per hundred of the polymerizable base composition.

10. The method according to claim 7, wherein the tackifier is selected from the group consisting of terpene based resins, coumarone based resins, phenol resins, and rosin based resins.

11. The method according to claim 10, wherein the tackifier is a rosin based resin.

12. The method according to claim 11, wherein the rosin based resin is an esterified tall oil rosin.

13. The method according to claim 7, wherein the coating is a primary coating.

14. The method according to claim 7, further comprising:
   preparing a fiber optic ribbon comprising a plurality of substantially aligned, substantially planar optical fibers encapsulated by a matrix material, each of the plurality of optical fibers being encapsulated by the coating.

15. The method according to claim 14, wherein the coating is a primary coating.

16. The method according to claim 7 wherein said tackifier comprises a rosin based resin.

17. The method according to claim 16 wherein said rosin based resin comprises an esterfied tall oil rosin.

18. A method of improving the processing characteristics of a coating material during preparation of an optical fiber, said method comprising:
   preparing an optical fiber comprising a fiber encapsulated by a coating, the coating being a polymerization product of a polymerizable composition substantially free of unsaturated epoxidized diene polymers, the polymerizable composition comprising a polymerizable base composition and an amount of a tackifier effective to reduce the occurrence of coating failure during said preparing an optical fiber, said tackifier being selected from the group consisting of terpene based resins, coumarone based resins, petroleum resins, hydrogenated petroleum resins, phenol resins, and rosin based resins.

19. The method according to claim 18, wherein the tackifier is present in an amount between about 0.1 and about 10.0 parts per hundred of the polymerizable base composition.

20. The method according to claim 19, wherein the tackifier is present in amount between about 0.1 and about 1.0 parts per hundred of the polymerizable base composition.

21. The method according to claim 18, wherein the tackifier is selected from the group consisting of terpene based resins, coumarone based resins, phenol resins, and rosin based resins.

22. The method according to claim 21, wherein the tackifier is a rosin based resin.

23. The method according to claim 22, wherein the rosin based resin is an esterified tall oil rosin.

24. The method according to claim 18, wherein the coating is a primary coating.

25. The method according to claim 18 wherein said tackifier comprises a rosin based resin.

26. The method according to claim 25 wherein said rosin based resin comprises an esterfied tall oil rosin.

27. A method of reducing the occurrence of microbending during handling or use of an optical fiber, said method comprising:
preparing an optical fiber comprising a fiber encapsulated by a coating, the coating being a polymerization product of a polymerizable composition substantially free of unsaturated epoxidized diene polymers, the polymerizable composition comprising a polymerizable base composition and an amount of a tackifier effective to reduce the occurrence of microbending, said tackifier selected from the group consisting of terpene based resin, coumarone based resin, petroleum resins, hydrogenated petroleum resins, styrene resins, phenol resins, and rosin based resin.

28. The method according to claim 27, wherein the tackifier is present in an amount between about 0.1 and about 10.0 parts per hundred of the polymerizable base composition.

29. The method according to claim 28, wherein the tackifier is present in amount between about 0.1 and about 1.0 parts per hundred of the polymerizable base composition.

30. The method according to claim 27, wherein the tackifier is selected from the group consisting of terpene base resin, coumarone base resin, phenol resins, and rosin based resin.

31. The method according to claim 30, wherein the tackifier is a rosin based resin.

32. The method according to claim 31, wherein the rosin based resin is an esterified tall oil rosin.

33. The method according to claim 27, wherein the coating is a primary coating.

34. The method according to claim 27 wherein said tackifier comprises a rosin based resin.

35. The method according to claim 34 wherein said rosin based resin comprises an esterfied tall oil rosin.

36. A method of making a coated optical fiber, the fiber having a core and a cladding, the method comprising the steps of:
drawing an optical fiber at a rate of more than about 20 m/s;
applying a first coating composition substantially free of unsaturated epoxidized polymers and comprising a urethane acrylate and a tackifier present in an amount effective to modify a time-sensitive rheological property of the polymerization product of the composition;
polymerizing the first coating composition to obtain a low modulus primary coating;
applying a second coating composition to the fiber, wherein the secondary composition comprises acrylate functional material; and
polymerizing the second coating composition.

37. The method according to claim 36 wherein said tackifier is selected from the group consisting of terpene based resins, coumarone based resins, phenol resins, and rosin based resins.

38. The method according to claim 37 wherein said tackifier comprises a rosin based resin.

39. The method according to claim 38 wherein said rosin based resin comprises an esterfied tall oil rosin.

* * * * *